(No Model.)
G. D. FOX.
COOKING APPARATUS.
No. 602,317. Patented Apr. 12, 1898.
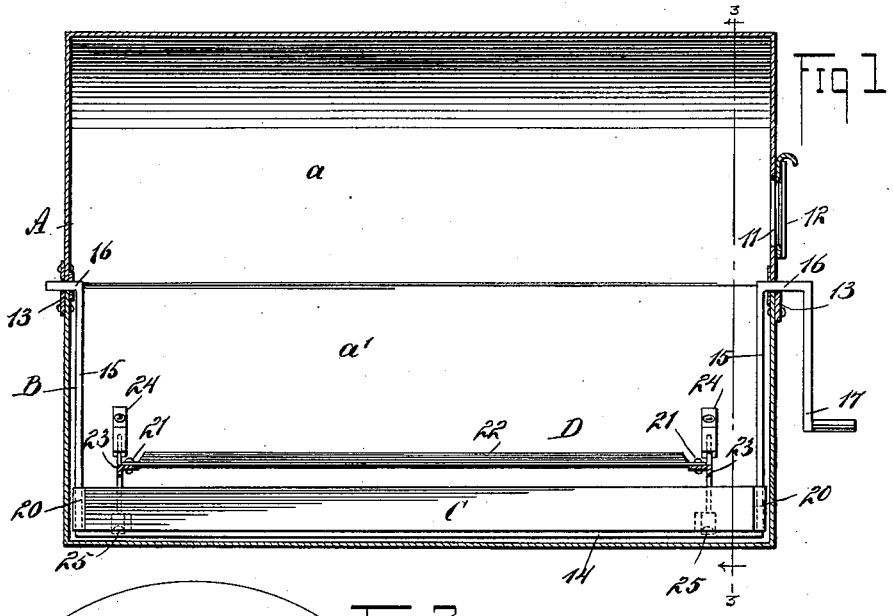
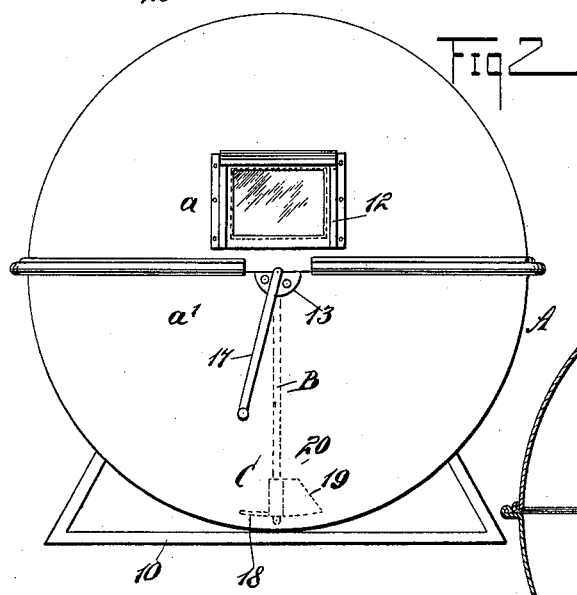
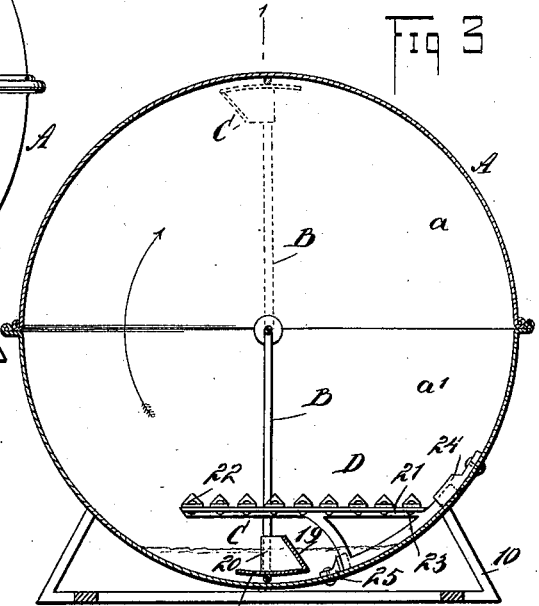
WITNESSES:
INVENTOR
G. D. Fox.
BY
ATTORNEYS.

UNITED STATES PATENT OFFICE.

GEORGE DOUGLAS FOX, OF BUFFALO, NEW YORK.

COOKING APPARATUS.

SPECIFICATION forming part of Letters Patent No. 602,317, dated April 12, 1898.

Application filed May 13, 1897. Serial No. 636,289. (No model.)

*To all whom it may concern:*

Be it known that I, GEORGE DOUGLAS FOX, of Buffalo, in the county of Erie and State of New York, have invented a new and Improved Cooking Apparatus, of which the following is a full, clear, and exact description.

The object of my invention is to provide a cooking apparatus for roasting joints of meat, poultry, &c., so constructed that the meat may be thoroughly basted as often as required by simply operating a handle at the exterior of the pan, thus making unnecessary the hot and unpleasant work of basting by hand and insuring a proper browning and even cooking of the article in the pan.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical section through a pan having the improvement applied, and section being taken on the line 1 1 in Fig. 3. Fig. 2 is an end view of the pan, and Fig. 3 is a vertical transverse section taken substantially on the line 3 3 of Fig. 1.

The pan A is shown in the drawings as cylindrical, such being the preferred shape, and the pan is divided into two longitudinal sections—an upper section $a$ and a lower section $a'$. A base 10, of suitable construction, is secured to the bottom section in order that the pan shall stand properly in the oven. At one or both ends of the upper section $a$ of the pan a side opening 11 is made, and said opening may be closed, as shown, by a shutter 12, preferably mounted to slide and provided with a transparent pane. The object of the openings 11 is to permit a person to ascertain whether the article being cooked is done or has been sufficiently browned.

A bearing 13 is made in the upper edge of each end of the lower pan-section $a'$. These bearings support a crank-shaft B. The crank-shaft consists of a horizontal member 14, which extends practically from end to end of the pan, and members 15, which extend to the upper edge of the lower pan-section, the said end members terminating in trunnions 16, said trunnions entering said bearings 13, and a handle 17, shown in the form of a crank, is secured to one of the trunnions, the handle being outside of the pan, as shown in Figs. 1 and 2.

A scoop C is carried by the member 14 of the crank-shaft, and the said scoop is usually made as illustrated in Fig. 3, in which it consists of a bottom 18, more or less curved, extending beyond opposite sides of the member 14 of the crank-shaft, and a side member 19, which extends downward from the end members 15 of the crank-shaft to a connection with a side edge of the bottom 18 of the scoop. The scoop is preferably so made that it can be taken apart for the purpose of shipping or cleaning.

An eye or a socket 20 is formed at each end of the scoop, through which eyes the end members 15 of the crank-shaft are passed, the scoop being secured to the shaft in any suitable or approved manner. Above the scoop a platform D, upon which the article to be roasted is placed, is secured to the bottom of the pan at one side of a central vertical section thereof. This platform may be made in any suitable manner. As illustrated, it is somewhat in the shape of a gridiron, comprising end bars 21 and cross-bars 22. The platform is supported at each end by a bracket 23. These brackets engage with the bottom of the pan near one side and are held securely in place by clamps 24 and 25 of any desired form.

In operation the scoop is normally at the bottom of the pan, beneath the platform D. The article to be roasted having been placed on the platform and the pan placed in the oven with the end having the handle 17 applied facing outward, the meat may be readily basted by simply turning said handle. As the meat roasts the juices or gravy will drop to the bottom of the pan, and as the handle 17 is revolved the scoop will take up the gravy, and as the scoop is carried to the upper position (shown in dotted lines in Fig. 3) all the gravy will be spilled out therefrom and will fall over the article on the platform, thoroughly basting the same. By turning back the handle the scoop will be carried to its normal position ready to be again brought into action.

The sections of the pan are usually so made that one may be fitted into the other in transportation.

Having thus described my invention, I claim as new and desire to secure by Letters Patent—

1. A roasting apparatus, comprising a pan having a curved bottom, a platform of less length than the pan and secured to the bottom of the pan at one side of a central vertical section thereof, a crank-shaft consisting of a horizontal member extending from end to end of the pan and vertical end members having their upper ends terminating in trunnions journaled in bearings in the pan, one of said trunnions terminating in a handle, and a scoop secured to the horizontal member of the crank-shaft and extending the entire length thereof, substantially as described.

2. A roasting apparatus, consisting of two semicylindrical sections, the lower section being provided with a base, a gridiron of less length than the pan and secured to the bottom of the lower section at one side of a central vertical section thereof, a crank-shaft, consisting of a horizontal member extending from end to end of the lower section and vertical members having their upper ends terminating in trunnions journaled in bearings in the upper portion of said lower section, one of the trunnions terminating in a handle, and a scoop secured to the horizontal and end members of the crank-shaft, the said scoop projecting beyond opposite sides of the said horizontal member, substantially as herein shown and described.

GEORGE DOUGLAS FOX.

Witnesses:
WM. J. HUMASON,
IRA R. AMSDEN, Jr.